Figure 1A:
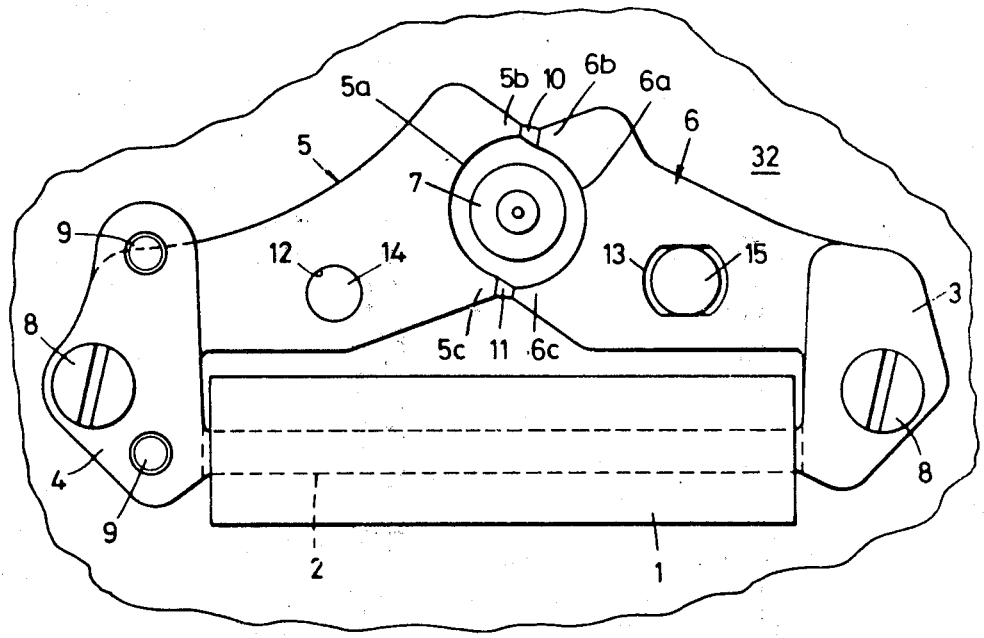

United States Patent [19]

Giger et al.

[11] 4,277,704
[45] Jul. 7, 1981

[54] MOTOR FOR ELECTRONIC WATCH
[75] Inventors: Urs Giger, Solothurn; Norberto Perucchi, St. Blaise, both of Switzerland
[73] Assignee: Eta A.G. Ebauches-Fabrik, Grenchen, Switzerland
[21] Appl. No.: 966,219
[22] Filed: Dec. 4, 1978
[30] Foreign Application Priority Data
Dec. 13, 1977 [CH] Switzerland ............ 15316/77
[51] Int. Cl.³ ............................. H02K 37/00
[52] U.S. Cl. ......................... 310/49 R; 310/162; 368/76
[58] Field of Search .......... 310/40 MM, 49, 162–165; 58/23 R, 23 D

[56] References Cited
U.S. PATENT DOCUMENTS

| 2,121,699 | 6/1938 | Janzen | 310/163 |
| 2,804,680 | 9/1957 | Flagg, Jr. | 29/155.5 |
| 3,142,774 | 7/1964 | Lundin | 310/163 X |
| 3,949,251 | 4/1976 | Takatsuki | 310/49 |
| 4,066,947 | 1/1978 | Nakajima et al. | 310/49 X |

FOREIGN PATENT DOCUMENTS 259575 6/1949 Switzerland .
1457676 12/1976 United Kingdom .

Primary Examiner—Donovan F. Duggan
Attorney, Agent, or Firm—Stevens, Davis, Miller & Mosher

[57] ABSTRACT

A stepping motor particularly intended for electronic watches comprises two poles connected to a core bearing an elongated coil. The poles are joined at nose portions thereof by interposed elements of a material having a magnetic permeability as close as possible to 1. The one-piece stator may be formed by blanking from a composite band, thus considerably simplifying the problem of positioning the poles of the stator relative to the plate of the watch movement and to the rotor. A method of fabricating the one-piece stators efficiently consists in rolling together two strips of ferromagnetic metal and an interposed fillet of non-magnetic metal, these elements being joined at their edges to form a composite band from which the stators are blanked.

8 Claims, 7 Drawing Figures

MOTOR FOR ELECTRONIC WATCH

This invention relates to motors for electronic watches, and more particularly to a motor of the type having a rotor, a magnetic coil, a core disposed in the coil, a stator having two poles, each connected to an end of the core and including two nose portions joined by a concave edge embracing the rotor, and a supporting plate.

Stepping motors of this type have already been proposed (cf. U.K. Patent Specification No. 1,457,676). In general, the rotor includes a cylindrical magnet having diametrical magnetization, thus exhibiting a north pole and a south pole. At each pulse, it effects a 180° rotation in a certain direction; and in order to ensure this operation, the edges of the stator poles facing the rotor are blanked along an assymetrical outline to produce an air gap having a minimum width in a specific orientation, corresponding to the position in which the rotor stops between pulses. It is essential that the orientation of the rotor upon stopping be so chosen that restarting is sure to take place in the desired direction upon the appearance of the following pulse.

One of the advantages of motors of the foregoing type is that it is possible to use rotors of very small diameter, thus having very low inertia, which contributes towards reducing the energy to be developed at each pulse for accelerating and driving the gear-train. However, as a consequence of the reduction of the size of the rotor, especially of its diameter, the stator poles must not only be blanked with extreme precision, but also positioned relative to the rotor in such a way that the suape of the gap corresponds to the desired shape within an extremely narrow range of tolerance. Thus, for example, in the case of a rotor 1.6 mm in diameter, embraced by two poles having mutually offset arcuate edges, the eccentricity of each pole with respect to the axis of the rotor must be 0.02 mm within a guaranteed tolerance of ±5 microns. This requirement naturally gives rise to manufacturing and assembly problems which are difficult to solve, above all if these motors are supposed to be mass-produced, for it is necessary to be able to apply mass-production methods and to avoid adjustments and corrections during assembly as far as possible.

Until now, efforts have been made to produce the stator poles by blanking plates, each plate being provided with two positioning holes. The poles have been mounted on the plate of the water movement, this plate including a bearing for the rotor and two pairs of positioning pins engaging the poles. The poles are secured by screws to the ends of the core bearing the coil. However, this system requires manufacturing precautions which impede mass-production.

In other types of motors, in which the stator includes rigid ferromagnetic elements (cf. U.S. Pat. No. 2,804,860) or a bundle of stator plates (cf. Swiss Patent No. 259,575), designs have already been proposed in which the polepieces are joined to one another at nose portions thereof by means of interposed elements of a non-magnetic metal made integral with the polepieces. These connecting elements are soldered, welded, or brazed to the polepieces. However, in these previous designs, the stator assembly is supported by rigid elements which fix the polepieces rigidly with respect to one another. Moreover, these are designs in which the accuracy of positioning of the polepieces with respect to one another does not play any decisive part since the motors involved are not stepping motors in which the shape of the poles determines the direction of rotation of the rotor.

It is an object of this invention to provide an improved stepping motor for electronic watches, of the type initially mentioned, which can be mass-produced by simple means within the positioning tolerances between the polepieces and the rotor which ensure the starting of the rotor in the proper direction at each step owing to an eccentricity of some few hundredths of a millimeter in the outline of the inner edge of the polepieces.

To this end, in the motor according to the present invention, the poles are joined to one another by solid elements having low magnetic permeability which make the poles integral with one another in such a way as to constitute a one-piece stator, this one-piece stator being secured on the plate.

A particularly advantageous method of manufacturing the stator of this motor consists in forming the stator by a blanking operation carried out on a composite band comprising two parallel strips of a ferromagnetic material having high permeability and an interposed fillet of a material having low permeability joined at its two edges to the edges of the parallel strips, thereby making them integral.

The composite band itself may be formed by simultaneous hot-rolling and welding of the two strips and the interposed fillet.

Figure 1B:
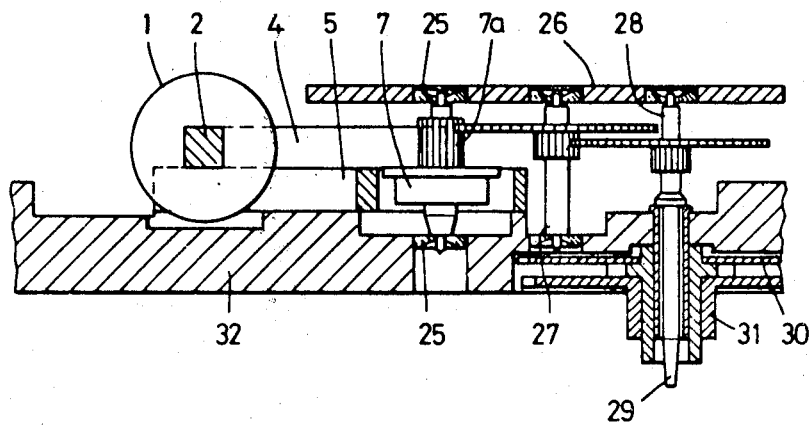
Figure 2:
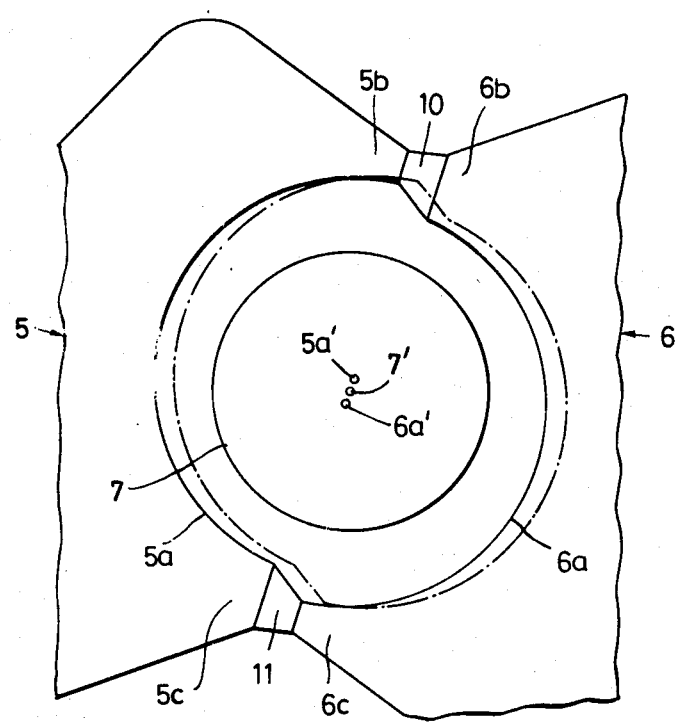
Figure 4:
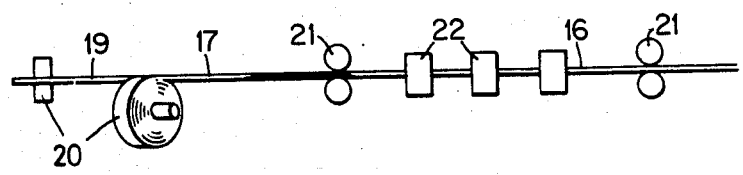
Figure 3:
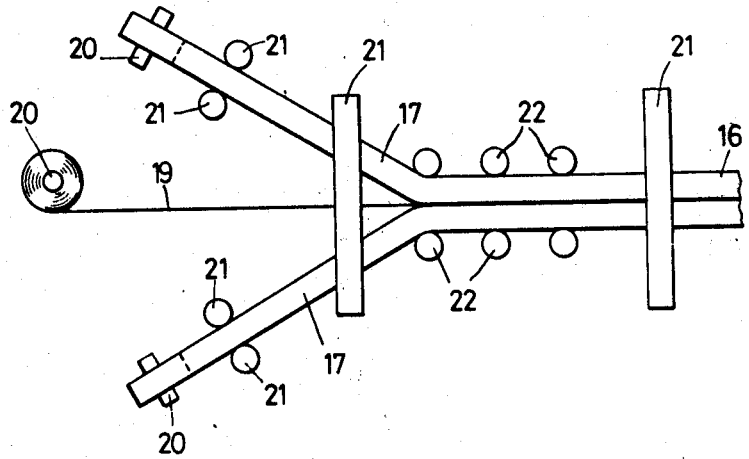
Figure 5:
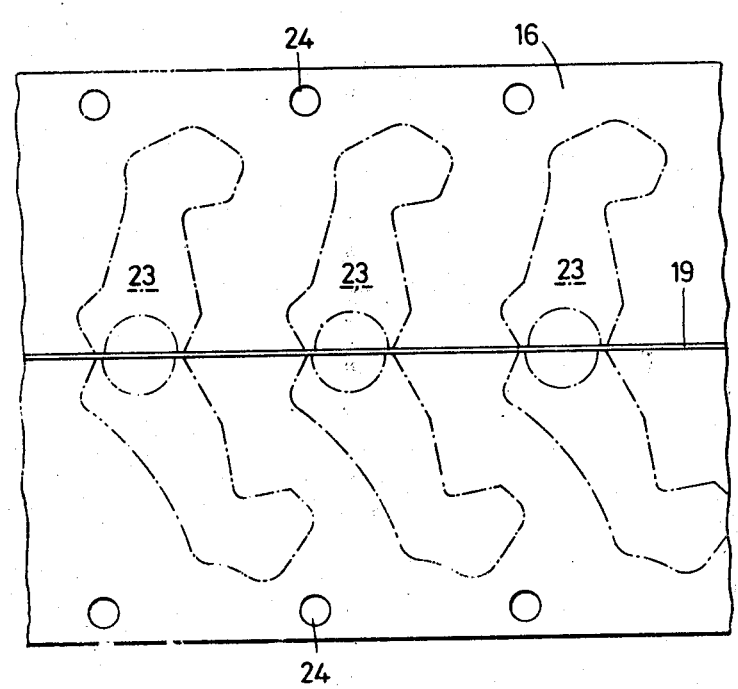
Figure 6:
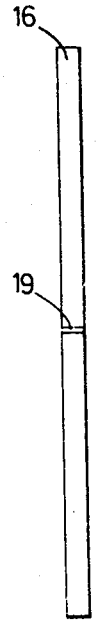

A preferred embodiment of the invention will now be described in detail with reference to the accompanying drawings, in which:

FIG. 1a is a plan view of the motor,
FIG. 1b is a section through the axis of the rotor,
FIG. 2 is a partial plan view on a larger scale, showing the rotor and the parts of the poles nearest thereto,
FIGS. 3 and 4 are a diagrammatic plan view and longitudinal elevation, respectively, on a smaller scale, illustrating the fabrication of a composite band, and
FIGS. 5 and 6 are a top plan view and a front elevation, respectively, of the composite band from which the stators are blanked.

The motor shown in FIG. 1, like conventional motors of this type, comprises an elongated coil 1 surrounding a core 2 which may, for example, have a square cross-section, and the ends of which include connection clips 3 and 4 to which poles 5 and 6, embracing a rotor 7, are secured. The poles 5 and 6 are fixed to the clips 3 and 4 by screws 8. Two positioning holes 12 and 13 in the poles 5 and 6 make it possible to fix the motor assembly with respect to a plate 32 of a watch movement.

Each of the poles 5 and 6 has a concave arcuate edge 5a, 6a extending over an arc of a little less than 180° and, at both ends of this curved edge, two nose portions 5b, 5c, 6b, 6c. The edges 5a and 6a are offset with respect to the axis of the rotor 7, and the centers of these edges, designated as 5'a and 6'a in FIG. 2, are situated one on each side of the axis of the rotor, designated as 7' in FIG. 2.

As will be seen from the drawing, the poles 5 and 6 are integral with one another, for the spaces between the nose portions 5b, 6b and the nose portions 5c, 6c are occupied by interposed trapezoidal elements 10 and 11 having the same thickness as the poles 5 and 6 themselves, but made of a material having low magnetic permeability, i.e., practically speaking, of a material such as brass, aluminum, etc., the magnetic permeability of which is close to that of air or of a vacuum. The interposed elements 10 and 11 situated between the homologous nose portions of the poles 5 and 6 are bound by adherence to the end faces of the respective nose portions and consequently make the poles 5 and 6 integral so as to constitute a one-piece stator.

This one-piece stator is positioned on the plate 32 of the watch movement by the round hole 12 blanked in the pole 5 and by the elongated hole 13 blanked in the pole 6. Thus, a highly accurate positioning is obtained without exerting stress on the metal of which the one-piece stator is made. A pin 14 set in the plate 32 engages the hole 12, while a cylindrical pin 15, having a diameter equal to the width of the hole 13, engages the latter. It will be noted that the centers of the pins 14 and 15 are situated on a straight line which is almost perpendicular to a line passing through the centers of the interposed elements 10 and 11. These positioning means make it possible to place the one-piece stator in such a way that the aperture formed by the two offset arcs 5a, 6a and the inner edges of the elements 10 and 11 is as accurately centered as possible relative to the axis of the rotor 7.

FIG. 1b shows the arrangement of the one-piece stator 5, 6 on the plate 32 of the watch movement. Here the rotor 7 is seen to be situated in the central aperture of the one-piece stator. It pivots in two bearings 25 fixed to the plate 32 and to a bridge 26, respectively. The pinion 7a of the rotor 7 meshes with a first rotating part 27 which likewise pivots between the bridge 26 and the plate 32 and which drives a fourth wheel-and-pinion 28, the arbor 29 of which passes through the plate 32 and is intended to bear a seconds-hand (not shown). Other elements of the gear-train (not shown) actuate a center-wheel 30, the pipe of which bears the minute-hand, whereas a conventional minute-wheel (not shown) drives an hour-wheel 31.

By means of the pins 14 and 15 and the screws 8, the stator and the core 2 of the motor are held in place rigidly and with great precision on the plate 32, without any other assembly element.

The advantage of using a one-piece stator of the type described above during assembly is that an error in centering has far less influence on operation than if two independent poles are each positioned with slight errors relative to the rotor. Because the two poles are integral with one another, the deformation of an air gap as compared with its ideal shape is compensated for by an inverse deformation of the other air gap. This is what is shown by the dot-dash line in FIG. 2, which represents the position of the aperture of a one-piece stator slightly displaced as compared with the ideal position. The magnetic blocking position of the rotor is practically not modified by the deformation of the air gap, the size of which increases regularly in clockwise direction despite the off-centering of the stator.

There are various ways of making the one-piece stator 5,6. FIGS. 3-6 illustrate a particularly advantageous method wherein the stators are formed by blanking. This method comprises a first operation consisting in fabricating a composite band 16 formed of two strips 17 of ferromagnetic material and an interposed fillet 19. As may be seen in FIGS. 3 and 4, these three components of the band 16 are unrolled from reels 20 and are led by pairs of rollers 21 having vertical and horizontal axes in such a way that the three components converge and are pressed against one another laterally by rollers 22. The operation may be carried out in a furnace with a controlled atmosphere so that the edges of the elements are welded to one another. The strips 17 are identical, may be made of iron having high permeability, for example, and will be, for example, 9 mm wide and 0.7 mm thick, whereas the interposed fillet 19 will be a ribbon of brass 0.7 mm high by 0.3 mm wide. The result is the composite band 16 shown on a larger scale in FIGS. 5 and 6, from which band stators 23 are blanked in the required size. The blanking operation may be carried out in a conventional swage unit, the band being positioned by means of holes 24, and this operation is known to make possible guaranteed tolerances of dimensions in the micron range. The requisite precision is thus ensured by the application of methods allowing mass-production.

It should be noted, however, that other methods of manufacture may equally well be envisaged for obtaining the composite one-piece stators 23. Thus, for example, these stators might be blanked from strips of homogeneous material, and the areas intended to form the interposed elements 10 and 11 might then be treated in such a way as to reduce their magnetic permeability. For this purpose, operations of ion implantation, diffusion, or irradiation may be envisaged.

A motor provided with a one-piece stator such as described above, with a rotor 1.6 mm in diameter, and having an air gap 0.4 mm wide in its central portion, can drive a wrist-watch gear-train by discontinuous rotation of 180° per second when energized by pulses having a duration of less than 8 ms.

What is claimed is:

1. A stepping motor for electronic watches comprising an elongated stator plate having two ends and a central opening, the latter having a closed edge, a supporting plate on which said stator plate is secured, an elongated core magnetically connected to both ends of said stator plate, a coil wound onto said core, and a rotor lodged in said opening, wherein said stator plate comprises two pole portions and two joining elements, each one of said pole portions comprises two nose portions and a concave edge portion each of which joins two corresponding ones of said nose portions and forms a portion of said closed edge of said opening, wherein said joining elements are integral with said stator plate and have the same thickness as said pole portions, each one of said joining elements extends between two nose portions not belonging to the same pole portion, and said pole portions are of a material having a high magnetic permeability whereas said joining elements are of a material having a low magnetic permeability.

2. A motor in accordance with claim 1, wherein said stator is positioned by means of two fixed cylindrical pins, one of said pins being engaged in a round hole and the other in an elongated hole in said stator.

3. A motor in accordance with claim 1, wherein each of said joining elements extends between two homologous nose portions of said poles in the same plane as said poles.

4. A motor in accordance with claim 1, wherein said elements are made of a material different from that of said poles and are bonded to said nose portions by adherence.

5. A motor in accordance with claim 1, wherein said joining elements are formed of the same basic material as said poles and have a structure for lowering the magnetic permeability thereof.

6. A motor in accordance with claim 1, wherein each said concave edge of said poles exhibits an arcuate outline offset with respect to said rotor, the centers of the two arcs being situated on a single straight line passing through the axis of said rotor perpendicular to said axis.

7. A motor in accordance with claim 6, wherein said straight line passes through the centers of said joining elements.

8. A motor in accordance with claim 3, wherein the thickness of said joining elements is the same as that of said poles of said stator.

* * * * *